Jan. 19, 1937. W. WEERS, JR 2,068,044
EMERGENCY BRAKE FOR SLEDS OR SLEIGHS
Filed March 24, 1936 2 Sheets-Sheet 1
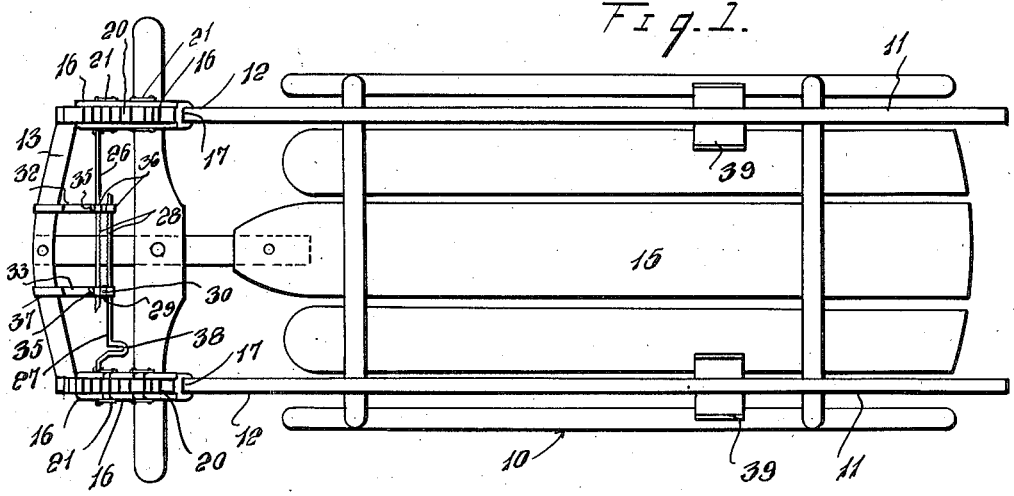
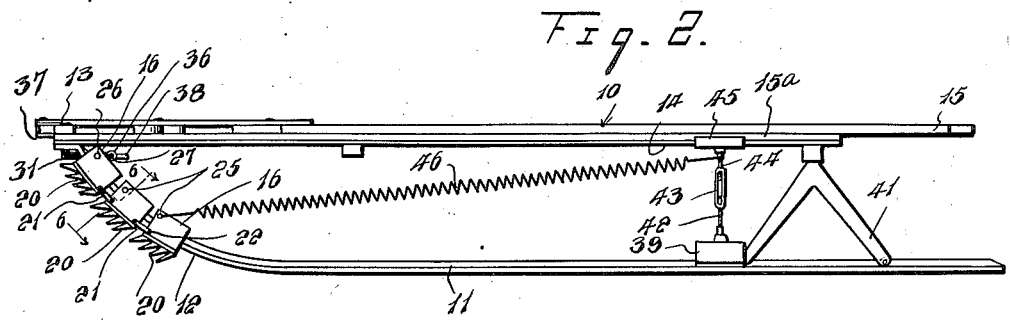
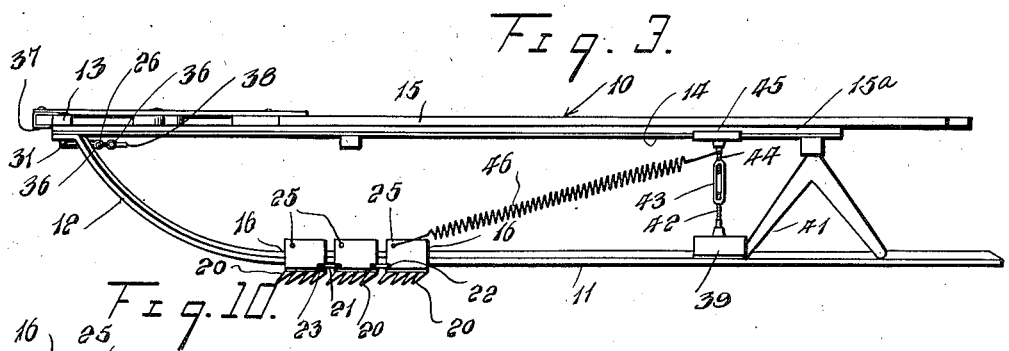
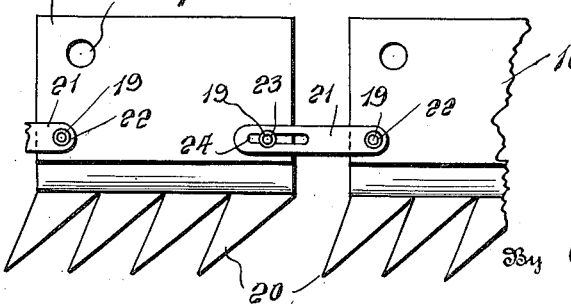
Inventor
William Weers Jr.
By L. F. Randolph Jr.
Attorney

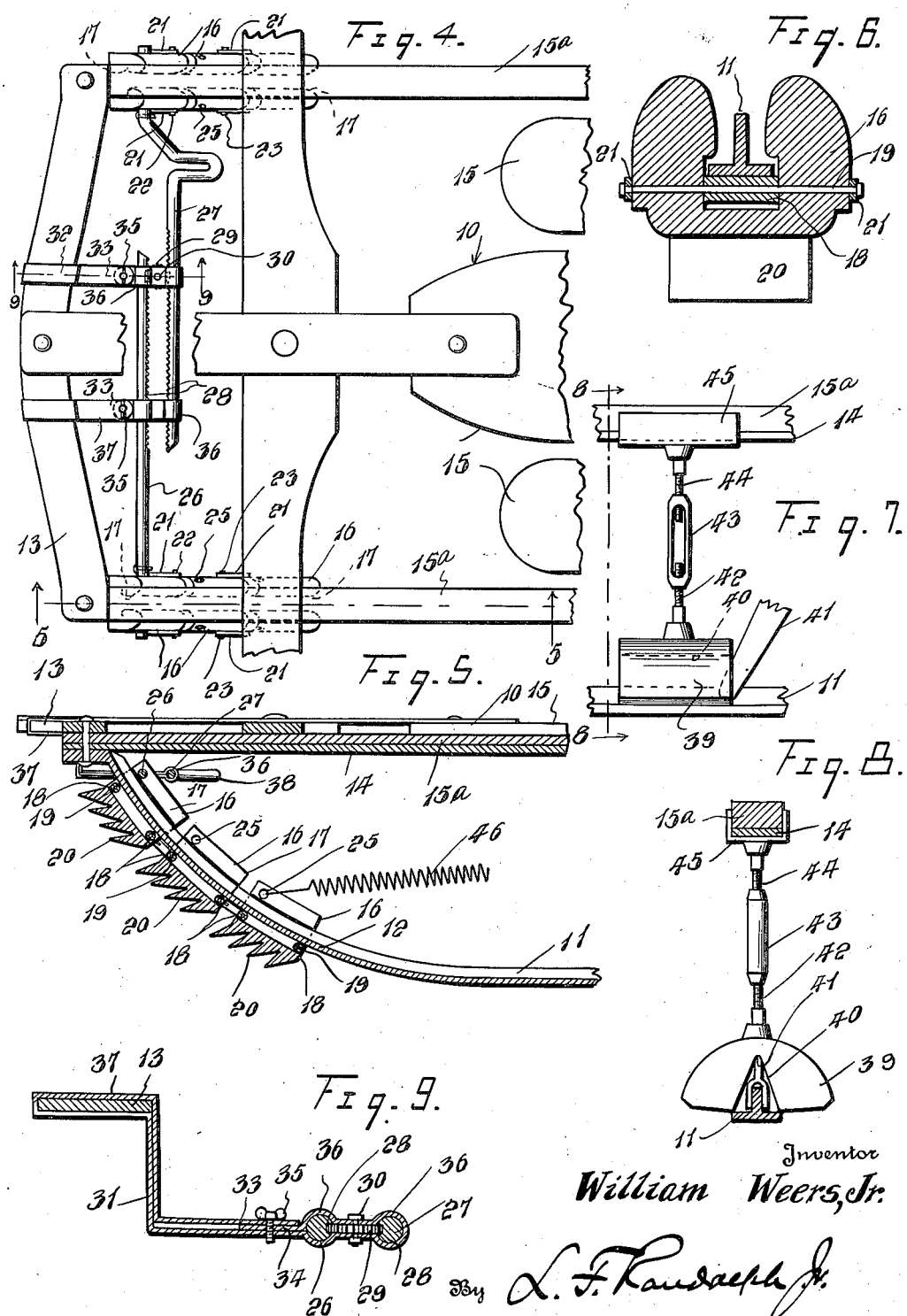

Patented Jan. 19, 1937

2,068,044

UNITED STATES PATENT OFFICE 2,068,044

EMERGENCY BRAKE FOR SLEDS OR SLEIGHS

William Weers, Jr., Bronx, N. Y.

Application March 24, 1936, Serial No. 70,708

8 Claims. (Cl. 188—8)

This invention relates to an emergency brake for sleighs or sleds and it aims to generally provide an improved construction supporting greater braking power, and a construction which is more positive in action, less complicated, and less likely to be accidentally applied.

It is particularly aimed to provide a construction which may be readily attached to or detached from the sled or sleigh and which does not require the drilling of holes or other mutilation of the sled or sleigh to accommodate its fastening.

Another object is to provide a construction wherein the spring means are elevated and less likely to become ice-filled and frozen and also to provide a construction which may be readily reset by one person.

Various additional objects and advantages will become apparent from a consideration of the description following taken in connection with accompanying drawings illustrating an operative embodiment.

In said drawings:—

Figure 1 is an inverted plan view of a sled or sleigh embodying my improvement;

Figure 2 is a side elevation of said sled or sleigh, showing the emergency brake means retracted;

Figure 3 is a view similar to Figure 2 showing the emergency brake means applied;

Figure 4 is an enlarged, fragmentary plan view of the sled or sleigh;

Figure 5 is a sectional view taken on the line 5—5 of Figure 4;

Figure 6 is a sectional view taken on the line 6—6 of Figure 2;

Figure 7 is an enlarged side elevation particularly showing the stop device;

Figure 8 is a cross sectional view taken on the line 8—8 of Figure 7;

Figure 9 is a sectional view taken on the line 9—9 of Figure 4; and

Figure 10 is a fragmentary, enlarged side elevation of the brake shoes.

Referring specifically to the drawings, 10 generally designates a conventional sled or sleigh. For the purposes of an understanding of my invention, and other parts, said sleigh or sled comprises runners 11 preferably of metal and T-shaped in cross section and curving upwardly and forwardly at the front as at 12. A transverse bar 13 extends across the front, and above the runners 11 bars 14, longitudinally disposed, are fastened against the under surface of the side bars 15ᵃ of the sled top 15.

In carrying out the invention, one or more shoes are provided at 16 on each of the runners 11. Such shoes as shown in Figure 6, are bifurcated, providing cut-away portions 17 so that the shoes may be tilted and applied to the runners 11 while the latter are in operative position on the sled or sleigh. Such brake shoes 16, in the cut-away portions, beneath the runners, are equipped each with a plurality of rollers 18, journaled on bolts 19 detachably carried by the brake shoes. Said rollers 18 engage the under surfaces of the runners. Snow-gripping teeth or braking teeth, of any desired shape and number are provided on each shoe as at 20. Said brake shoes 16 are preferably used in pluralities as shown, the same being connected together by means of links 21 pivoted at 22 adjacent the forward ends of the shoes and at 23 to the rear end of the shoes, the pivotal connections 23, preferably passing through elongated slots 24, enabling the necessary relative movement of the shoes in traveling along the runners and the curved portions 12 thereof.

Said shoes 16 preferably have transverse openings 25 therethrough adjacent their forward upper corners, and the openings 25 of the forward shoes 16 are releasably entered by detaining or latch rods 26 and 27. The said rods 26 and 27 have rack teeth at 28 and mesh with the teeth of a gear or pinion 29. Pinion 29 is pivoted by means of a pin 30, preferably a detachable bolt, carried by a bracket 31. Bracket 31 is made of flexible bar metal and has a portion 32 adapted to receive and clamp around cross bar 13, the free end portion 33 of such clamp being overlapping with another free end portion 34 of such clamp. A clamping screw 35 is threaded in an opening provided in the portions 33, 34 and the other portion of the clamp. Such clamp has guide rings or loops 36 in which the rods 26 and 27 slide. A clamp 37 is also provided, being identical with the clamp 32 except that it does not have a pinion 29 and bolt 30 serving for the mounting and guidance of the rods 26 and 27.

It will be noted that the rod 27 has a rearward projection at 38 adapted for hand or foot operation to slide the rod 27 inwardly in order to release the same from the openings 25 of the adjacent shoes and through such movement to turn the pinion 29 and retract or move the rod 26 inwardly to release the other shoe, at the same time.

A suitable stop device 39, bifurcated at 40, straddles the runners 11 on each side thereof and abutting struts 41 of the sled. Such stop devices have screw-threaded shanks 42 rising therefrom. Threaded to the shanks 42 are turn buckles 43, in turn screw-threaded to shanks 44 carried by clamp sections 45, preferably of channel shape and engaging the bars 14 from below. Attention is called to the fact that the screw-threads of the shanks 42 and 44 are reversed and that the screw-threads of the turn buckle engaged therewith are correspondingly reversed or opposite. As a result, the turn buckle 43 may be operated to tightly secure the stop 39 in place.

At opposite sides of the device, contractile coil springs 46 are employed, fastened at their rear ends to the shank 44, by means of hooks passing detachably through openings in the shank 44, and fastened at their forward ends by hooks detachably engaging the openings 25 of the rearmost brake shoes 16. It will be realized that the springs 46 are elevated with respect to the runners and hence are maintained as far as practical away from the ice and snow to avoid the accumulation of the same on the springs and danger of its freezing thereon.

It will be realized that the construction is in the nature of an attachment for existing sleds, although obviously it may be built into the sled or sleighs initially if desired.

Normally the brake shoes 16 are retracted and held on the curved portion 12 of the runner as best shown in Figures 2 and 5. When it is desired to apply the emergency brake, the user of the sled either by means of a hand or foot engages the projection 38, sliding it laterally and causing the rods 26 and 27 simultaneously to disengage the brake shoes 16 on the opposite sides of the sled, such shoes thereupon sliding by gravity so that the rearmost one engages the ground or snow. Forward movement of the sled, however, continues relatively to the shoes, the runners traveling on the rollers 18 until the rearmost shoes engage the stop members 39, whereupon the sled is brought to a complete stop very quickly and effectively. The brake shoes 16 are readily reset in the retracted positions of Figures 2 and 5, preferably when the sled or sleigh is inverted.

Various changes may be resorted to provided they fall within the spirit and scope of the invention.

I claim as my invention:—

1. In combination with a sled or sleigh and a runner thereof, a shoe, manually controlled means holding said shoe out of ground engaging position, said shoe having a bifurcated portion, said bifurcated portion removably engaged with said runner, and spring means normally urging the shoe into ground engaging position.

2. In combination with a sled or sleigh and a runner thereof, a shoe, said shoe having a bifurcated portion, said bifurcated portion removably engaged with said runner, a roller in the bifurcated portion beneath and engaging the runner, and means on the shoe mounting said roller.

3. In combination with a sled or sleigh and a runner thereof, a shoe, said shoe having a bifurcated portion, said bifurcated portion removably engaged with said runner, spaced rollers in the bifurcated portion beneath and in engagement with the runner, mounting elements on the shoe for said rollers, and braking teeth on the shoes.

4. In combination with a sled or sleigh and a runner thereof, a shoe, said shoe having a bifurcated portion, said bifurcated portion removably engaged with said runner, spaced rollers in the bifurcated portion beneath and in engagement with the runner, mounting elements on the shoe for said rollers, braking teeth on the shoes, said runner having a forward curved portion on which the shoe is normally held, a releasable rod normally holding the shoe retracted, and stop means on the sled engageable by the shoe after release and travel along the runner.

5. In combination with a sled or sleigh and a runner thereof, a shoe, said shoe having a bifurcated portion, said bifurcated portion removably engaged with said runner, spaced rollers in the bifurcated portion beneath and in engagement with the runner, mounting elements on the shoe for said rollers, braking teeth on the shoes, said runner having a forward curved portion on which the shoe is normally held, a releasable rod normally holding the shoe retracted, stop means on the sled engageable by the shoe after release and travel along the runner, and spring means normally urging the shoe toward the stop means.

6. In combination with a sled or sleigh and a runner thereof, a shoe, said shoe having a bifurcated portion, said bifurcated portion removably engaged with said runner, spaced rollers in the bifurcated portion beneath and in engagement with the runner, mounting elements on the shoe for said rollers, braking teeth on the shoes, said runner having a forward curved portion on which the shoe is normally held, a releasable rod normally holding the shoe retracted, stop means on the sled engageable by the shoe after release and travel along the runner, turn buckle clamping means securing said stop to the sled, and a contractile spring secured to said turn buckle clamping means and to said shoe, urging the shoe toward the stop.

7. In combination with a sled, and its runners, brake members disposed on said runners, rods engaging said brake shoes to maintain the latter retracted, said rods being relatively slidable and having gear teeth thereon, and pinion means engaging the gear teeth and causing retraction of one rod through retracting movement of the other rod.

8. In combination with a sled, and its runners, brake members disposed on said runners, rods engaging said brake shoes to maintain the latter retracted, said rods being relatively slidable and having gear teeth thereon, pinion means engaging the gear teeth and causing retraction of one rod through retracting movement of the other rod, clamping means on the sled guiding and mounting said rods, and said clamping means also mounting said pinion means.

WILLIAM WEERS, Jr.